United States Patent [19]

Minowa

[11] Patent Number: 4,791,491
[45] Date of Patent: Dec. 13, 1988

[54] SUPPLEMENTAL DATA GENERATION FOR COMPLEMENTING ADJACENT LINES OF FACSIMILE DATA

[75] Inventor: Takehiko Minowa, Hino, Japan

[73] Assignee: Kabushiki Kaisha Toshiba, Kanagawa, Japan

[21] Appl. No.: 9,778

[22] Filed: Feb. 2, 1987

[30] Foreign Application Priority Data

Jan. 31, 1986 [JP] Japan .................................. 61-17804

[51] Int. Cl.⁴ ........................ H04N 1/23; H04N 1/387
[52] U.S. Cl. ................................................. 358/284
[58] Field of Search ............... 358/284, 280, 294, 287; 382/41, 47

[56] References Cited

U.S. PATENT DOCUMENTS

| | | | |
|---|---|---|---|
| 4,323,974 | 4/1982 | Sekigawa | 358/284 |
| 4,486,785 | 12/1984 | Lasher | 358/284 |
| 4,506,382 | 3/1985 | Hada | 382/41 |
| 4,531,133 | 7/1985 | Leng | 358/284 |
| 4,536,802 | 8/1985 | Kurata | 358/287 |
| 4,544,264 | 10/1985 | Bassetti | 358/287 |

OTHER PUBLICATIONS

Translation of Japanese Patent Disclosure (Kokai) No. 49-52514, T. Watanabe et al., Disclosure date May 22, 1974.
Translation of Japanese Patent Disclosure (Kokai) No. 51-35215, J. Ikeuchi et al., Disclosure date Mar. 25, 1976.

Primary Examiner—Tommy P. Chin
Attorney, Agent, or Firm—Banner, Birch, McKie & Beckett

[57] ABSTRACT

A method of generating supplemental lines for placement between adjacent lines of real data, such as adjacent lines of facsimile data, is disclosed. Supplemental lines are generated in a curvilinear fashion in order to smooth the transition between the adjacent lines of real data, and is of particular utility in facsimile devices and the like where the real data would otherwise be printed in a noncontiguous manner, that is, with gaps therebetween.

13 Claims, 5 Drawing Sheets

SUPPLEMENTAL DATA GENERATION FOR COMPLEMENTING ADJACENT LINES OF FACSIMILE DATA

BACKGROUND OF THE INVENTION

1. Technical Field

The present invention is directed to supplemental data generation for complementing adjacent lines of real data, wherein the adjacent lines of data would otherwise be printed in a noncontiguous manner; that is, the adjacent lines of data would otherwise be printed with a gap therebetween.

The present invention is embodied in a facsimile recording device wherein data is printed on a line-by-line basis using a printing head such as a thermal or electrostatic printing head. The present invention generates supplemental data to be inserted in the gap between the adjacent lines of facsimile data in order to improve the visual quality of the facsimile print-out.

2. Background Information

The transmission and reception of data between facsimile devices is well know to those skilled in the art, the standard of transmission having been set worldwide by the International Telegraph and Telephone Consultative Committee (CCITT). The vertical resolution standard set by the CCITT is 3.85 lines per millimeter for standard resolution, and 7.7 lines per millimeter for optional resolution.

Typically, facsimile devices print facsimile data on a line-by-line basis using a thermal printing head whose width is at least as wide as the line to be printed. Employing the above resolution standards, adjacent lines of facsimile data are noncontiguous; that is, there is a gap which lies between the adjacent lines. Because of this, the printed quality is visually poor.

Figure 1A:
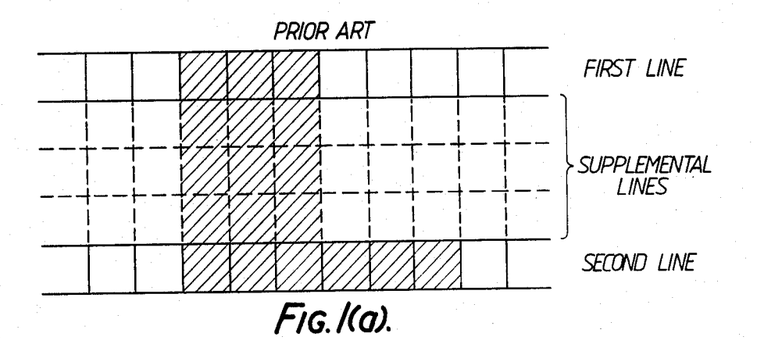
FIG. 1 illustrates prior art techniques of generating supplemental data for placement between adjacent lines of facsimile data.
Figure 1B:
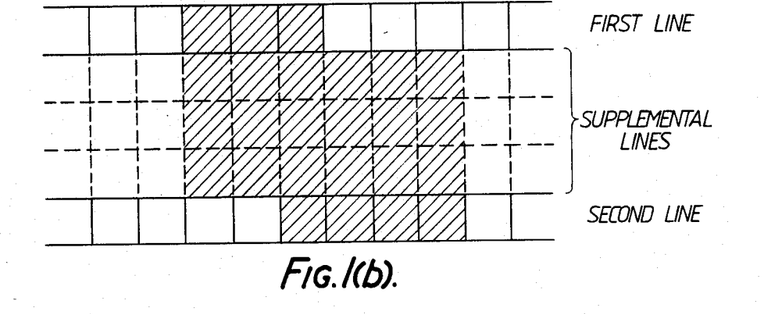
Figure 1C:
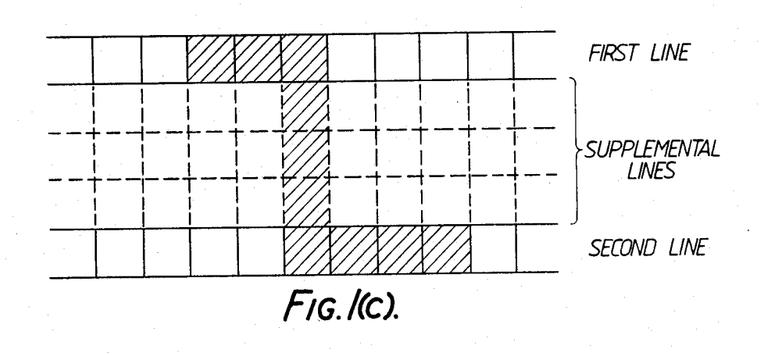

In order to compensate, the prior art has developed supplemental data generation techniques for printing supplemental data lines of data between the adjacent lines of facsimile data in order to visually improve the quality of the facsimile printout. For example, with reference to FIG. 1, a plurality of supplemental data lines are inserted between adjacent lines of real data in order to mask the gap between adjacent lines. In the most common technique, as shown in FIG. 1(a) and described in Japanese Laid Open Application No. 49-52514 assigned to the NEC Corporation, herein incorporated by reference, a first line of facsimile data is repeatedly printed until the receipt of a second line of facsimile data, at which point the second line is repeatedly printed until the reception of a third line. This process continues until all real lines of facsimile data have been printed.

Other techniques have also been employed by the prior art to mask the gap between adjacent lines of facsimile data. For example, the "sum" technique, shown in FIG. 1(b) and described in Japanese Laid Open Application No. 51-35215 and assigned to the same assignee as the present invention, herein incorporated by reference, prints supplemental lines comprising the summation of the adjacent lines of facsimile data. The "difference" technique, shown in FIG. 1(c) and described in the 51-35215 Application, prints supplemental lines comprising the difference between the adjacent lines of facsimile data.

The prior art techniques for generating supplemental data are adequate in situations where the adjacent lines are substantially linear in the vertical direction. However, the prior art produces poor results when the transmission to be printed contains substantial amounts of curvilinear data, as typically found in pictorial drawings and the character set of most alphabets, especially Arabic, Chinese and Japanese.

SUMMARY OF THE INVENTION

Accordingly, it is an object of the present invention to provide a rapid supplemental data generation technique for generating supplemental lines to be inserted between adjacent lines of real data, wherein the supplemental lines complement the adjacent lines of real data in a curvilinear fashion.

It is also an object of the present invention to provide a rapid supplemental data generator which is both simple in structure and low in cost.

In accordance with the above objectives, a method of generating the supplemental data for complementing adjacent lines of facsimile data in a curvilinear fashion will now be described with reference to FIG. 2.

Turning now to FIG. 2, adjacent lines of real data $A_1$ and $A_2$ would typically be printed with a gap therebetween such that a plurality of supplemental lines may be inserted in that gap in order to visually improve the printing quality. The number of supplemental lines which are to be inserted in the gap is controllable by the facsimile device. Although almost any number of lines may be inserted, it is preferable to use at least two supplemental lines, and more preferable to use three. Accordingly, the following example will be described for three supplemental lines of data to be inserted between the adjacent lines of real data in a facsimile device.

Figure 2A:
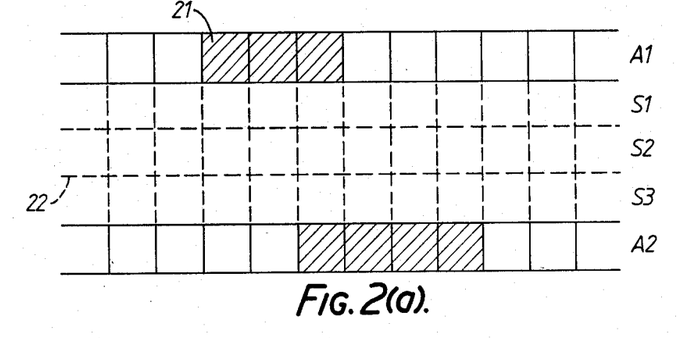
FIG. 2 illustrates the present invention's concept of generating supplemental data for placement between adjacent lines of facsimile data in a curvilinear fashion.
Figure 2B:
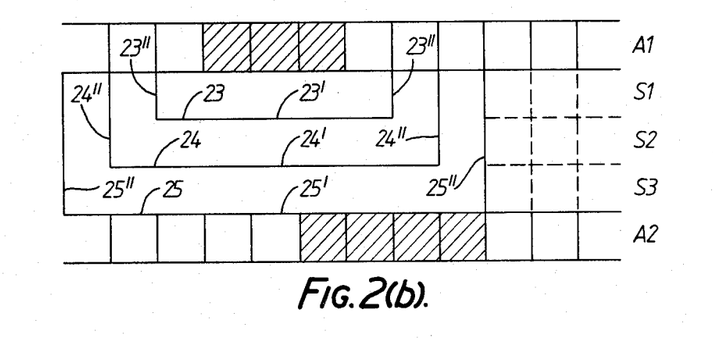
Figure 2C:
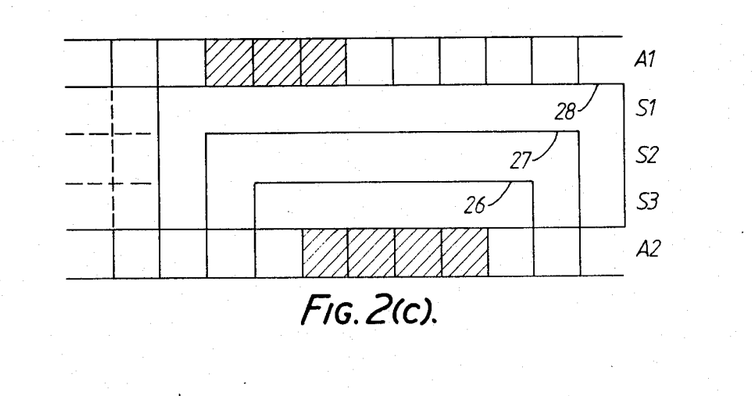
Figure 2D:
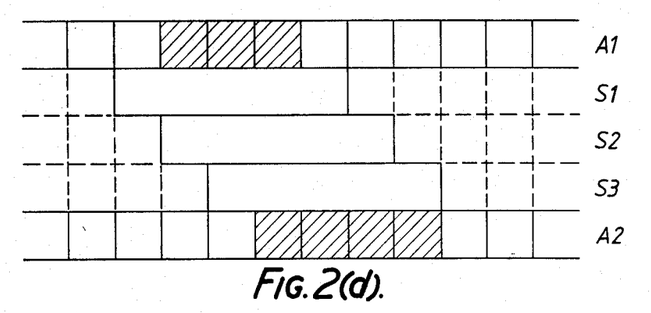

Typically, facsimile devices print on a line-by-line basis using a thermal printing head. The thermal printing head contains, for example, a plurality of discrete thermal printing units, typically 4096. Each printing unit, when appropriately controlled, causes discrete characters 21 to be printed on the thermal sensitive paper. Character as used herein generally refers to one of the plurality of pixels which comprise letters, pictorial drawings, and the like. For the purpose of the discussion and to facilitate an explanation of the present invention, it is assumed that character 21 is substantially uniform, having a predetermined length l and height h. These dimensions set up matrix 22 between the adjacent lines of facsimile data. It should be understood to persons skilled in the art that while each character is, in fact, substantially square, the characters may have a rectangular shape. For the case of a square character, l will equal h, as shown in the drawings. Three borders, 23, 24 and 25, shown in FIG. 2(b), surround the contiguous group of characters on first adjacent line $A_1$ in a concentric manner based on the dimensions of character 21. The horizontal portion (23', 24', 25') of the borders are a distance N*h from the lower portion of the first real data line character $A_1$. Also, the vertical portions (23", 24", 25") of the borders are a distance N*l from the left-most and right-most characters of the group of contiguous characters on first real data line $A_1$. In the preferred embodiment, the borders can overlap each other. This holds true for N=1, 2 and 3. Similarly, borders 26, 27 and 28 are set up around the group of contiguous characters of second adjacent line $A_2$, as shown in FIG. 2(c).

The area in which the supplemental data points or characters are to be printed is determined by the intersecting boundary between inverse borders. That is, the intersection of border 23 with border 28 represents the area on supplemental line S1 to be printed. Similarly, the intersection between borders 24 and 27 and the intersection between borders 25 and 26 represents the areas on supplemental lines S2 and S3, respectively, to be printed. These areas are shown separately in FIG. 2(d). The printing of characters 21 in these areas produces supplemental lines S1, S2 and S3 as shown in FIG. 2(e).

Figure 2E:
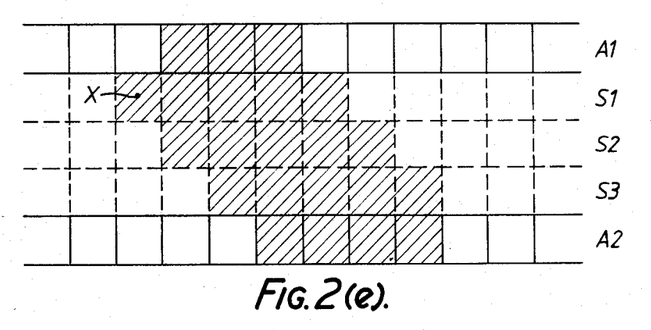
Figure 2F:
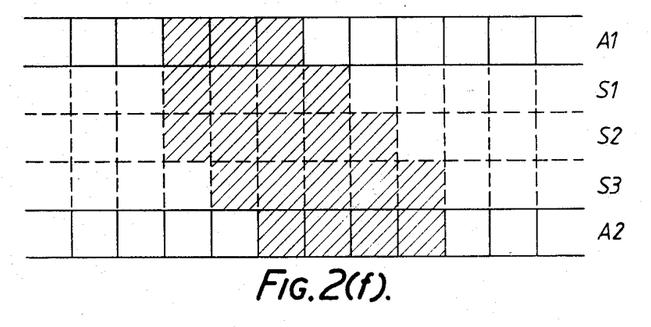

Character X, shown on supplemental line S1 of FIG. 2(e), although part of the intersection of borders 23 and 28, appears visually out of place because it is not vertically disposed between the left-most of the contiguous characters on the first real line and the right-most of the contiguous characters on the second real line. Accordingly, in the preferred embodiment, character X is not printed. The supplemental characters which are printed on supplemental lines S1, S2 and S3, and therefore, appear as the curvilinear complement to adjacent lines A1 and A2 as shown in FIG. 2(f).

The above-described method for generating supplemental data for complementing adjacent lines of facsimile data in a curvilinear fashion is based on the intersection of inverse borders. Mathematically, for a total of M supplemental lines, a first set of borders N (i.e., the borders shown in FIG. 2(b)) can be described as being a distance N*h from the lower portion of the first real data line and a distance N*l from the left-most and right-most characters of a group comprising at least one contiguous character on the first real data line for N=1, 2, ..., M; the second set of borders L (i.e., the border shown in FIG. 2(c)) can be described as being a distance L*h from the upper portion of the second real data line and a distance L*l from the left-most and right-most characters of a group comprising at least one contiguous character on the second real data line for L=1, 2, . . . , M; and the area of each supplemental line to be printed can be expressed as the intersection between border sets N and L, wherein L=[(M+1)−N]for N=1, 2, . . . , M. Generally, in the facsimile recording field, the character is substantially square thus, predetermined length l equals the predetermined height h as shown in FIG. 2. However, the character may be another shape, such as a circle having predetermined horizontal width and an equivalent predetermined vertical width.

For characters having a shape other than square or rectangular, the first and second set of borders can be determined as follows: The first set (N) of M borders about a group of contiguous characters on the first real data line is determined, each border N being a distance N*x from the left-most and right-most characters of the group of contiguous characters on the first real data line and a distance N*y from the lower portion of the first real data line for N=1, 2, . . . , M, wherein x corresponds to the effective horizontal width of the character and y corresponds to the effective vertical height of the character. The second set (L) of M borders about a group of contiguous characters on the second real data line is determined, each border L being a distance L*x from the left-most and right-most characters of the group of contiguous characters on the second real data line and a distance L*y from the upper portion of the first real data line for L=1, 2, . . . , M. As discussed above, the area of each supplemental line to be printed is expressed as the intersection between border sets N and L, wherein L=[(M+1)−N]for N=1, 2, . . . , M.

The circuitry required to carry out the above method will now be described with reference to FIGS. 3 and 4.

DESCRIPTION OF THE PREFERRED EMBODIMENTS

Figure 3:
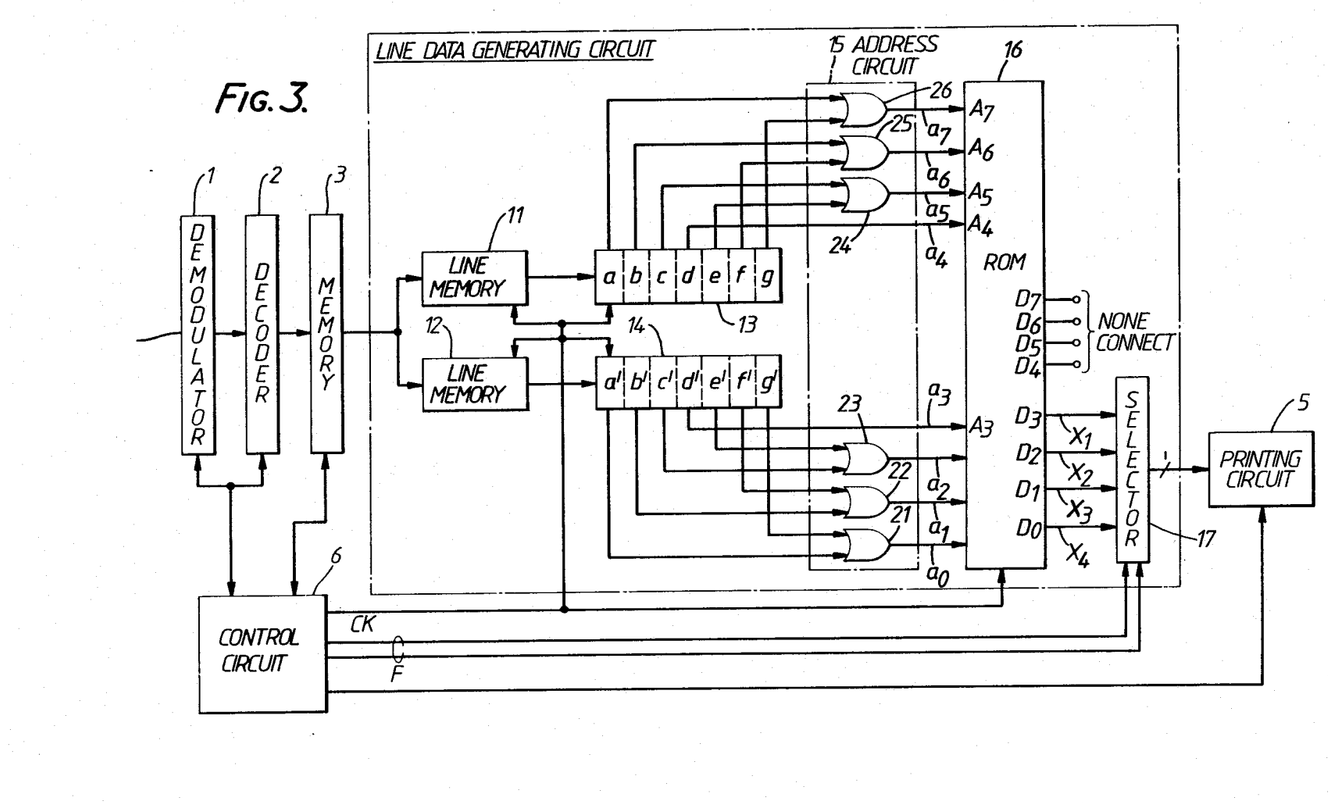
FIG. 3 shows a block diagram of an embodiment of the present invention for generating the supplemental data in a curvilinear fashion as shown in FIG. 2.

Turning now to FIG. 3, a block diagram of an embodiment of the present invention for generating the supplemental data in a curvilinear fashion is shown. Demodulator 1 receives modulated facsimile data from a transmitting facsimile device and demodulates the signal to baseband. The demodulated signals are supplied to decoder 2 for proper decoding. These operations are well known to those skilled in the art.

Decoder 2 outputs a stream of binary data to memory 3, preferably a dynamic random access memory (DRAM). Memory 3 acts as a buffer memory device capable of storing at least a plurality of adjacent lines of facsimile data, control circuit 6 generating the appropriate control signals to prevent overflow of memory 3.

The binary data output from memory 3 is supplied to line data generating circuit 4, which generates the supplemental data in a curvilinear fashion. The facsimile and supplemental data are printed by printing circuit 5, also controlled by control circuit 6.

Control circuit 6, a microcomputer in the preferred embodiment, controls the timing operations of the respective components. Additionally, control circuit 6 selects the scanning density mode for printing circuit 5 as either the standard scanning density (3.85 lines per millimeter) or the optional scanning density (7.7 lines per millimeter), a technique known to those skilled in the art.

Line data generating circuit 4 includes line memories 11 and 12 for storing first and second lines of facsimile data A1 and A2, respectively. The lines of data are typically 4096 bits, although it will be readily apparent to those skilled in the art that a line of data may contain a different number of bits. Line memories 11 and 12 could be any type of binary memory device. In the preferred embodiment, line memories 11 and 12 are random access memory (RAM) devices. The associated circuitry for addressing line memories 11 and 12 (not shown) is well known to those skilled in the art. Line memories 11 and 12 serially supply shift registers 13 and 14 with 1 bit of data at each clock pulse CK, generated from control circuit 6.

Address circuit 15 includes six OR gates 21, 22, 23, 24, 25, and 26, and receives an output from each stage of shift registers 13 and 14. Address circuit 15 then suplies the 8 bit address data to 8 input terminals ($A_0$-$A_7$) of ROM 16, in order to select the appropriate address. First address bit $a_7$, received from a stage OR g stage, is supplied to address terminal $A_7$. Second address bit $a_6$, received from b stage OR f stage, is supplied to address terminal $A_6$. Third address bit $A_5$, received from c stage OR e stage is supplied to terminal $A_5$. Fourth address bit $a_4$, received from d stage is supplied to terminal $A_4$. Fifth address bit $a_3$, received from d' stage, is supplied to terminal $A_3$. Sixth address bit $a_2$, received from c' stage OR e' stage, is supplied to terminal $A_2$. Seventh address bit $a_1$, received from b' stage OR f' stage, is supplied to terminal $A_1$. Eighth address bit $a_0$, received from a' OR g' stage, is supplied to terminal $A_0$.

Read-only memory (ROM) 16, addressed via address circuit 15, outputs an 8-bit data word, however, on outputs $D_0$-$D_3$ only the 4-bits are actually used, based on the selected address. ROM outputs $D_3$-$D_0$ correspond to data outputs $X_1$-$X_4$, respectively. $X_1$ is the print information for the first line of facsimile data $A_1$, and $X_2$-$X_4$ represent the print information for supplemental lines $S_1$-$S_3$, respectively.

Selector 17, preferably a demultiplexer, selects the appropriate output in accordance with selection lines F generated by control circuit 6. Selector 17 selects one of the 4 bit outputs by select signal F consisting of a 2 bit signal. The select signal F is supplied in synchronism with clock signal CK. Selector 17 outputs the data from the selected data line to printing circuit 5, which, in the preferred embodiment, prints the output data on line-by-line bases using a thermal printing head. In the preferred embodiment, a high("1") output from selector 17 indicates to the printing circuit a print character, whereas a low ("0") output indicates a no-print (blank) character.

Printing circuit 5 comprises memory associated circuitry to store the output from selector 17 on a line-by-line basis. In the preferred embodiment, 4096 bits of information are stored to correspond to the 4096 heat generating elements contained in a line-by-line printing head. Printing circuit 5 is controlled by an enable line generated by control circuit 6 for printing the line of data when the print enable line is active.

CIRCUIT OPERATION

After communication is established between the transmitting and the receiving facsimile device, the receiving device of FIG. 3 demodulates the signals to baseband via demodulator 1. The demodulated signal is supplied to decoder 2 for proper decoding. Both operations are well known to those skilled in the art. The decoded signals are then supplied to memory 3 under the overflow protection afforded by control circuit 6.

In printing the first adjacent line, first and second adjacent lines of facsimile data $A_1$ and $A_2$ are supplied to line memories 11 and 12, respectively, which, in the preferred embodiment, store the requisite 4096 bits of line information. Line memories 11 and 12 serially shift the line data through shift registers 13 and 14, respectively, in synchronism with clock pulse CK generated by control circuit 6. In the preferred embodiment, the shift registers are cleared on power-up. Control circuit 6 generates selection lines F to select ROM output $X_1$, corresponding to first adjacent line $A_1$ of the received facsimile data. Control circuit 6 further enables printing circuit 5 to serially receive the selected data for printing. The ROM is configured such that the first line of facsimile data, as it passes through the d' stage of shift register 13, is output at ROM output $D_3$ for printing.

After the printing of first adjacent line $A_1$, shift registers 13 and 14 are preferably cleared. Although other methods will be readily obvious to those skilled in the art, the clearing of shift registers 13 and 14 is preferably accomplished by having line memories 11 and 12 output a series of 7 low-level bits after the last data bit of the respective line data.

After the printing of the first adjacent line is complete, the adjacent lines of facsimile data contained in line memories 11 and 12 are again shifted through shift registers 13 and 14, respectively. Control circuit 6 selects the $X_2$ line to be output from selector 17 by outputting the appropriate selection lines F. Further, control circuit 6 enables printing circuit 5 to receive the output from selector 17. In the preferred embodiment, printing circuit 5 is enabled only after information is shifted at least to the d or d' stages of shift registers 13 and 14, respectively.

Output data $X_2$, the information to be printed on first supplemental line $S_1$, is determined according to the following logical operation based on ROM addresses $A_0$-$A_7$:

$$X_2 = [A_4 \text{ AND } (A_3 \text{ OR } A_2 \text{ OR } A_1 \text{ OR } A_0)] \text{ OR } [A_3 \text{ AND } A_5]$$

As the above equation shows, if the d' stage of shift register 13 is high, and at least one of any of the stages of shift register 14 is high, then printing circuit 5 is instructed to print a character at the point on supplemental line 51 corresponding to the location of line $A_1$ found at stage d. Alternatively, if the d' stage of shift register 14 is high and at least one of either the c or e' stage of the shift register 13 is high, then the output $X_2$ which corresponds to that d' stage data is also going to be a printed character.

As noted from the above equation, the data contained in either the d or d' stage must be at a high level in order for output $X_2$ to also be at a high level. In this way, character X, shown with reference to FIG. 2(e), is excluded from being printed.

After the printing of first supplemental line $X_1$ is complete, control circuit 6 selects output $X_3$ from selector 17 by generating the appropriate control lines F, and shift registers 13 and 14 are cleared, as described above. Output $X_3$ corresponds to the information to be printed on second supplemental line $S_2$. Line memories 11 and 12 again shift the information contained therein to shift registers 13 and 14, respectively, and control circuit 6 enables printing circuit 5 as described above.

Output data $X_3$ is determined according to the following logical operation based on ROM address $A_0$-$A_7$:

$$X_3 = [A_4 \text{ AND } (A_3 \text{ OR } A_2 \text{ OR } A_1)] \text{ OR } [A_3 \text{ AND } (A_5 \text{ OR } A_6)]$$

As shown by the above equation, output $X_3$ is high whenever the d' stage from shift register 13 is high and at least one of the d'-f' stages from shift register 14 are high. Alternatively, output $X_3$ is high whenever the d' stage is high and at least one of the b, c, e or f stages of shift register 13 is high. The equation for $X_3$ also limits the printing of character X on supplemental line $S_2$.

After the printing of second supplemental line $S_2$, shift registers 13 and 14 are cleared and line memories 11 and 12 again supply shift registers 13 and 14 with the data for adjacent lines $A_1$ and $A_2$, respectively. Control circuit 6 generates the appropriate selection lines F so that selector 17 selects output $X_4$ and controls printing circuit 5 to print the output of selector 17.

Output data $X_4$ is determined according to the following logical operation based on ROM address $A_0$-$A_7$:

$$X_4 = [A_4 \text{ AND } (A_3 \text{ OR } A_2)] \text{ OR } [A_3 \text{ AND } (A_5 \text{ OR } A_6)]$$

As shown in the above equation, output $X_4$ is high whenever the d' stage of shift register 13 is high and at least one of c', d' or e' stages of shift register 14 are high. Alternatively, output $X_4$ is high whenever the d' stage of shift register 14 is high and at least one of the b, c, e or f stages of shift register 13 is high. The equation for $X_4$ also limits the printing of character X on supplemental line $S_3$.

Subsequent to the printing of third supplemental line $S_3$, shift registers 13 and 14 are cleared. Thereafter, memory 3 supplies line memory 11 with the second line of facsimile data (formerly stored in line memory 12), and stores the next adjacent line of facsimile data in line memory 12. The above printing operation is repeated until all of the adjacent lines of facsimile data have been output.

In order to accomplish the rapid printing of supplemental lines, in the preferred embodiment, ROM 16 is supplied during manufacturing with the appropriate data so that outputs $D_0$-$D_3$ act in accordance with the above equations. The ROM data is preferably written into ROM 16 by a ROM writer in accordance with the following BASIC program, a process well known to those skilled in the art.

```
10 DIM A(10)
20 FOR I=0 TO 255
30 ADR=I
40 FOR N=7 TO 0 STEP -1
50 IF ADR=2^N THEN ADR=ADR-2_N: A(N)=1
   ELSE A(N)=0
60 NEXT N
70 IF A(4)=1 THEN X4=8 ELSE X4=0
80 IF (A(3) OR A(2) OR A(1) OR A(0)) AND A(4)=1-
   THEN GOTO 100
90 IF A(5) AND A(3)=1 THEN 100 ELSE 110
100 X3=4: GO TO 120
110 X3=0
120 IF (A(3) OR A(2) OR A(1)) AND A(4)=1 THEN
    140
130 IF (A(5) AND A(3) OR (A(6) AND A(3))=1
    THEN 140 ELSE 150
140 X2=2: GO TO 160
150 X2=0
160 IF (A(6) OR A(5)) AND A(4) THEN 180
170 IF (A(5) AND A(3)) OR (A(6) AND A(3))=1
    THEN 180 ELSE 190
180 X1=1: GOTO 200
190 X1=0
200 NEXT I
210 END
```

The above program can be modified by one skilled in the art so that character X, shown with reference to FIG. 2(e), will be printed. Additionally, the above program could be written in another program language to accomplish the same results.

Figure 4:
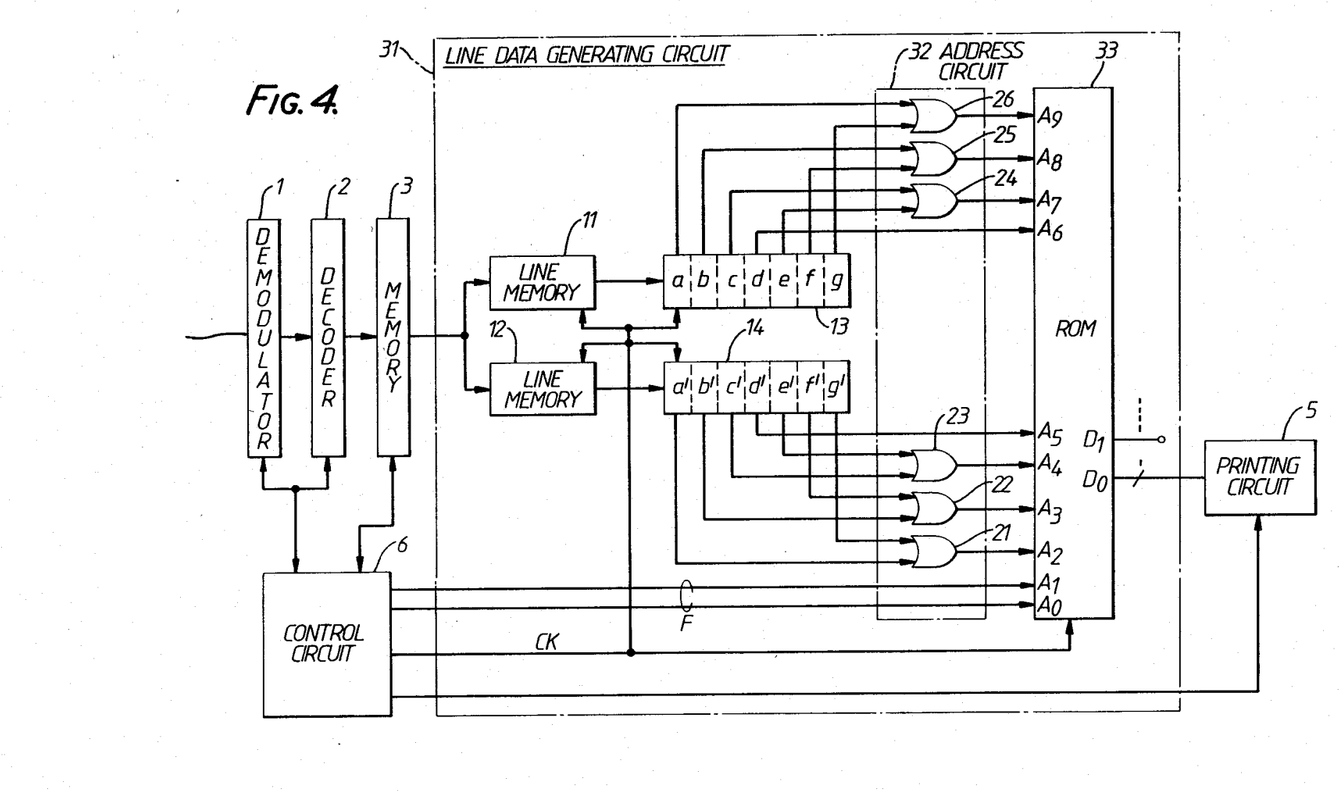
FIG. 4 shows a block diagram of another embodiment of the present invention for generating the supplemental data in a curvilinear fashion as shown in FIG. 2.

Turning now to FIG. 4, another embodiment of the line data generating circuit is shown. In this embodiment, the multiplexing operation performed by selector 17 of FIG. 3 is performed by ROM 33 via control lines to address $A_0$ and $A_1$ supplied by control circuit 6.

Accordingly, ROM 33 stores the four types of printing data ($X_1$, $X_2$, $X_3$ and $X_4$) which are to be supplied to printing circuit 5 via the appropriate address select lines $A_0$ and $A_1$, generated by control circuit 6. The contents of ROM 33 are predetermined by a program similar to that described with reference to FIG. 3, as will be readily apparent to those skilled in the art.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

For example, the number of supplemental lines may be adjusted by the user (e.g., one, two, four or larger number of supplemental lines). As discussed above, the desired logical operations are determined by the gating circuitry and the data stored in the ROM. Alternatively, ROM 16 or ROM 33 may be replace by a microcomputer for determining and generating the data output based on the appropriate output from shift registers 13 and 14 in accordance with the desired logical operations previously discussed. Alternatively, discrete gates may be employed in place of these ROMs and/or selector 17 in order to generate the appropriate output data.

What I claim as my invention is:

1. In a device for printing characters in a first and a second predetermined pattern on adjacent first and second real data lines, respectively, a method of generating M supplemental data lines comprising supplemental characters for placement between the adjacent real data lines to complement the adjacent real data lines in a curvilinear fashion, said method comprising the steps of:

determining a first set of M borders about a group of contiguous characters on the first real data line, each border N being a distance N*x from the left-most and right-most characters of the group of contiguous characters on the first real data line and a distance N*y from the lower portion of the first real data line for N=1, 2, ..., M, x corresponding to the effective horizontal width of the character and y corresponding to the effective vertical height of the character;

determining a second set of M borders about a group of contiguous characters on the second real data line, each border L being a distance L*x from the left-most and right-most characters of the group of contiguous characters on the second real data line and a distance L*y from the upper portion of the second real data line for L=1, 2, ..., M;

determining the intersecting boundary betwen the borders N and L, wherein L=[(M+1)−N] for N =1, 2, ..., M on each of the M supplemental lines; and, generating the supplemental characters on each of the M supplemental data lines at the locations determined by the intersecting boundry on each of the M supplemental lines.

2. The method of claim 1 wherein in the step of generating the supplemental characters on each of the M supplemental data lines, the character is generated only if it is vertically disposed between the left-most characters of the group of contiguous characters on the first real data line or the second real data line and the right-most character of the group of contiguous characters on the second real data line or the first real data line.

3. The method of claim 1 wherein the character is substantially rectangular, and x corresponds to a predetermined length l of the character and y corresponds to a predetermined height h of the character.

4. A device for printing characters in a first and a second predetermined patterns on adjacent first and second real data lines, respectively, including a line data generating means for generating M supplemental data lines comprising supplemental characters for placement between the adjacent real data lines to complement the adjacent real data lines in a curvilinear fashion, the line data generating means comprising:

first determining means for determining a first set of M borders about a group of contiguous characters on the first real data line, each border N being a distance N*x from the left-most and right-most characters of the group of contiguous characters on the first real data line and a distance N*y from the lower portion of the first real data line for N=1, 2, ... M, wherein x corresponds to the effective horizontal width of the character and y corresponds to the effective vertical height of the character;

a second determining means for determining a second set of M borders about a group of contiguous characters on the second real data line, each border L being a distance L*x from the left-most and right-most characters of the group of contiguous characters on the second real data line and a distance L*y from the upper portion of the second real data line for L=1, 2, ... M;

intersection determining means, coupled to said first and second determining means, for determining the intersecting boundary between the borders N and L; and, supplemental character generating means for generating the supplemental characters on each of the M supplemental data lines at the locations determined by the intersection determining means.

5. In a facsimile device for receiving encoded information from a transmitting facsimile device and printing characters in a first and second predetermined pattern on adjacent first and second real data lines, respectively, in accordance with a first and a second line of decoded information received, the facsimile device including means for communicating with the transmitting facsimile, means for decoding the encoded information, means for storing at least the first and the second line of decoded information, printing means for printing the first and the second lines of decoded information as the adjacent first and second real data lines, respectively, line data generating means coupled to receive the first and second lines of decoded information for supplying the printing means with the adjacent real data lines and M supplemental data lines comprising supplemental characters for placement between the real data lines for complementing the real data lines in a curvilinear fashion, and control means for controlling the operation of the facsimile device, said line data generating means comprising;

first and second line storage devices to store the first and second real data lines, respectively;

first and second shift registers operatively connected to said first and second line storage devices, respectively, for serially receiving the first and second real data lines from the respective line storage devices; and circuit means operatively coupled to said first and second shift registers for generating the M supplemental data lines for placement between the first and second real data lines, said supplemental data lines complementing the adjacent real data lines in a curvilinear fashion.

6. In the line data generating means of claim 5, said circuit means comprising:

a supplemental data memory device for storing the supplemental characters and outputting appropriate supplemental characters according to a selected address; and an address circuit coupled to said first and second shift registers to generate the selected address based on the contents of said shift registers.

7. In the line data generating means of claim 6, said first shift registers includes 7 bits having stages a-g, respectively, said second shift register includes 7 bits having stages a'-g', respectively;

said supplemental data memory device comprising a read-only memory including 8 address lines $A_0$-$A_7$, respectively; and said address circuit addressing address line $A_0$ as (a' OR g'); $A_1$ as (b' OR f'); $A_2$ as (c' OR e'); $A_3$ as d'; $A_4$ as d; $A_5$ as (c OR e); $A_6$ as (b OR f); and $A_7$ as (a OR g).

8. In the line data generating circuit of claim 7, said read-only memory outputting an (M+1) data word as the first real data line and the M generated supplemental data lines, said line data generating circuit further comprising:

a selector circuit coupled to the output of said read-only memory for receiving said (M+1) data word and serially outputting either the first data line or one of said M generated supplemental data lines in accordance with control signals generated by the control means.

9. In the line data generating circuit of claim 8, M=3.

10. In the line data generating circuit of claim 9, said read-only memory serially outputting the first generated supplemental line according to the value of the read-only memory address $A_0$-$A_7$ presented thereto by said address circuit in accordance with the following equation:

$$[A_4 \text{ AND } (A_3 \text{ OR } A_2 \text{ OR } A_1 \text{ OR } A_0)] \text{ OR } [A_5 \text{ AND } A_3].$$

11. In the line data generating circuit of claim 9, said read-only memory serially outputting the second generated supplemental line according to the value of the read-only memory address $A_0$-$A_7$ presented thereto by said address circuit in accordance with the following equation:

$$[A_4 \text{ AND } (A_3 \text{ OR } A_2 \text{ OR } A_1)] \text{ OR } [A_3 \text{ AND } (A_5 \text{ OR } A_6)].$$

12. In the line data generating circuit of claim 9, said read-only memory serially outputting the third generated supplemental line according to the value of the read-only memory address $A_0$-$A_7$ presented thereto by said address circuit in accordance with the following equation:

$$[A_4 \text{ AND } (A_3 \text{ OR } A_2)] \text{ OR } [A_3 \text{ AND } (A_5 \text{ OR } A_6)].$$

13. In the line data generating means of claim 6, said first shift register includes 7 bits having stages a-g, respectively, said second shift register includes 7 bits having stages a'–g', respectively;

said supplemental data memory device comprising a read-only memory including 10 address lines $A_0$–$A_9$, respectively;

said address circuit addressing address line $A_2$ as (a' OR g'); $A_3$ as (b' OR f'); $A_4$ as (c' OR e'); $A_5$ as d'; $A_6$ as d; $A_7$ as ( c OR e); $A_8$ as (b OR f); and $A_9$ as (a OR g);

said read-only memory outputting a serial data word as either the first real data line or one of said M generated supplemental data lines in accordance with the binary inputs to address lines $A_0$ and $A_1$; and the control means generating control signals $F_1$ and $F_2$ as selection control signals to address lines $A_0$ and $A_1$, respectively

* * * * *